US00RE39856E

(19) United States
(12) Reissued Patent
Ruthenberg

(10) Patent Number: US RE39,856 E
(45) Date of Reissued Patent: Sep. 25, 2007

(54) MULTICOLOR LED LAMP BULB FOR UNDERWATER POOL LIGHTS

(75) Inventor: Douglas Ruthenberg, Spring Hill, FL (US)

(73) Assignee: Zodiac Pool Care, Inc., Vista, CA (US)

(21) Appl. No.: 10/136,216

(22) Filed: May 1, 2002

Related U.S. Patent Documents

Reissue of:
(64) Patent No.: 6,184,628
Issued: Feb. 6, 2001
Appl. No.: 09/452,014
Filed: Nov. 30, 1999

(51) Int. Cl.
*H05B 37/00* (2006.01)

(52) U.S. Cl. ..... 315/185 R; 315/189; 315/193; 362/362; 362/800

(58) Field of Classification Search ..... 315/185 R, 315/189, 193, 323; 362/243, 244, 245, 362, 362/800
See application file for complete search history.

(56) References Cited

U.S. PATENT DOCUMENTS 5,165,778 A * 11/1992 Matthias et al. ..... 362/101
5,313,729 A * 5/1994 Sakai et al. ..... 40/452
5,374,876 A * 12/1994 Horibata et al. ..... 315/313
5,561,346 A * 10/1996 Byrne ..... 313/512
6,019,493 A * 2/2000 Kuo et al. ..... 362/335

* cited by examiner

*Primary Examiner*—David Vu

(57) ABSTRACT

A multicolor LED lamp bulb includes a hollow lamp body which has a substantially tapered intermediate portion, a longitudinal portion and a stem portion, a lens [sealingly] engaged with the longitudinal portion, a plurality of different colored LED bulbs mounted in a predetermined spaced-apart arrangement on a circuit board wafer mounted inside the lamp body in an orientation normal to the central axis of the lamp body, a controller circuit electrically connected wherein predetermined arrays of the plurality of different colored LED bulbs activate at predetermined sequences for predetermined time intervals, and a screw-type base affixed to the stem portion and adapted to engage a conventional lamp socket. The controller circuit includes a rectifier circuit for converting a 12 volt-ac source applied to the LED lamp bulb to a 12 volt-dc circuit for supplying electrical power to the arrays of the plurality of different colored LED bulbs. The lens includes a grid of grooves in opposite sides of the lens, the grooves on one side being oriented approximately 90° from a direction of the opposite side grooves.

14 Claims, 6 Drawing Sheets

MULTICOLOR LED LAMP BULB FOR UNDERWATER POOL LIGHTS

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to lamp construction using light emitting diode (LED) technology to provide multicolor effects in pools and spas.

2. Description of Related Art

Pool lighting is typically provided by a watertight encasement mounted at one or more locations in the wall of a pool below the waterline. Generally, a clear incandescent bulb rated for 12 volt-ac is used. If a color effect is desired, the encasement must be removed from the wall surface and pulled above the waterline. After removal of the watertight lens, a colored incandescent lamp can be screwed into the lamp socket. The lens is reinstalled and the encasement is placed back into the wall. The pool owner then has a constant single color effect within the pool. Another method of providing changing color effects in water includes a device for an aquarium wherein fixed lamps in combination with rotating transparent plates of varying colors are used.

LED technology for water use is known in the art. For example, U.S. Pat. No. 5,165,778 to Matthias et al. depicts the use of a single LED located at the end of a wire and placed within an aquarium at a desired location within or near an ornamental object placed inside the aquarium. U.S. Pat. No. 5,561,346 to Byrne depicts an LED lamp construction for adaptation to a traffic light for providing a low voltage light means for traffic signals. The colors are provided by the colored lenses generally attached to traffic signal lamps . . . are known in the art.

The aforementioned devices do not provide the ability to have a multicolor effect in underwater applications wherein the LEDs are sequenced to turn on predetermined arrays of different colored LEDs thereby providing a pool or spa owner with a dynamic multicolored illumination effect to this or her pool or spa.

SUMMARY OF THE INVENTION

The present invention is a multicolor LED lamp bulb which includes a hollow lamp body extending along a central axis, the lamp body further including a substantially tapered and symmetrically-shaped intermediate portion, a longitudinal portion integral to a proximal end of the intermediate portion extending a predetermined distance therefrom, and a stem portion substantially cylindrical in shape extending along the central axis. A proximal end of the stem portion is integral to a distal end of the intermediate portion.

A lens [encapsulates] *covers* the proximal end of the longitudinal portion [and is in a watertight and hermetically sealed engagement with an outside surface of the longitudinal portion].

A plurality of different colored light emitting diode (LED) bulbs are mounted in a predetermined spaced-apart arrangement on a circuit board wafer. The circuit board wafer is a printed circuit board which is disposed proximate the intermediate portion proximal end an is secured inside the lamp body wherein it is oriented normal to the central axis of the lamp body. The LED bulbs are mounted on the side of the circuit board wafer facing the lens and the printed wiring from the LED bulbs is on the opposite side for connecting to a controller circuit.

The controller circuit is in electrically operative communication with predetermined arrays of the plurality of different colored LED bulbs and wired in such a manner that the predetermined arrays of the plurality of different colored LED bulbs activate at predetermined sequences for predetermined time intervals.

The controller circuit is also electrically connected to a conventional screw-type base, such as those utilized with standard incandescent light bulbs. The screw-type base is affixed or secured to the stem portion and adapted to engage a conventional lamp socket for voltage transfer.

The controller circuit also includes a rectifier circuit for converting a 12 volt-ac source applied to the LED lamp bulb through electrical connections in the screw-type base to a 12 volt-dc circuit for supplying electrical power to the arrays of the plurality of different colored LED bulbs. The rectifier circuit may be incorporated into the controller circuit printed circuit board or it may be part of a separate printed circuit board that plugs into the printed circuit board with the controller circuit.

The lens optionally includes a grid of grooves in opposite sides of the lens. The grooves on one side are preferably oriented approximately 90° from the direction of the opposite side grooves. The grooves are typically V-shaped grooves and cane be arranged to form diamond, rectangular or square shapes when viewing the lens axially. Although the opposing directional grooves may be on the same side, it is preferable that they be on opposite sides of the lens.

The controller circuit may be integral to the circuit board wafer with the mounted plurality of different colored LED bulbs; although it is preferable for reduced manufacturing costs and ease of assembly and, in particular, replacement of defective controller circuits in an assembly line, that the controller circuit be integrated on a separate printed circuit board.

The plurality of different colored LED bulbs may typically include a combination of red, blue and green LED bulbs at a respective ratio of 5:3:3, for example, 40 red LED bulbs, 24 blue LED bulbs and 24 green LED bulbs, all arranged in predetermined clusters. It was found that this combination provided a substantially equalized and balanced light intensity and brilliance between these particular colors. Of course, different light color combinations may be used and other ratios are contemplated provide the circuitry is adapted to provide a desired equalized and balanced light intensity.

In one practical application of the present invention, an embodiment is presented wherein the plurality of different colored LED bulbs include eight clusters of five red LED bulbs, eight cluster of three blue LED bulbs, and eight clusters of three green LED bulbs, each cluster being in a predetermined spaced-apart arrangement on the circuit board wafer.

The longitudinal portion of the lamp body includes a ridge portion extending peripherally around the outside surface of the longitudinal portion for cooperatively engaging a mating recess portion in an overlapping portion of the lens. The lens is sealed to the lamp body at or near this point or area of contact.

The invention is adapted such that it can be used to replace the bulbs currently used in underwater pool light sockets, where a 12 volt-ac power source is supplied through the socket. This novel and nonobvious invention will provide pool owners, residential and commercial, an inexpensive way to have a beautiful display of changing colored lights within their pools.

BRIEF DESCRIPTION OF THE DRAWINGS

For a fuller understanding of the nature and objects of the invention, reference should be made to the following detailed description, taken in conjunction with the accompanying drawings, in which.

DETAILED DESCRIPTION OF THE INVENTION

Figure 1:
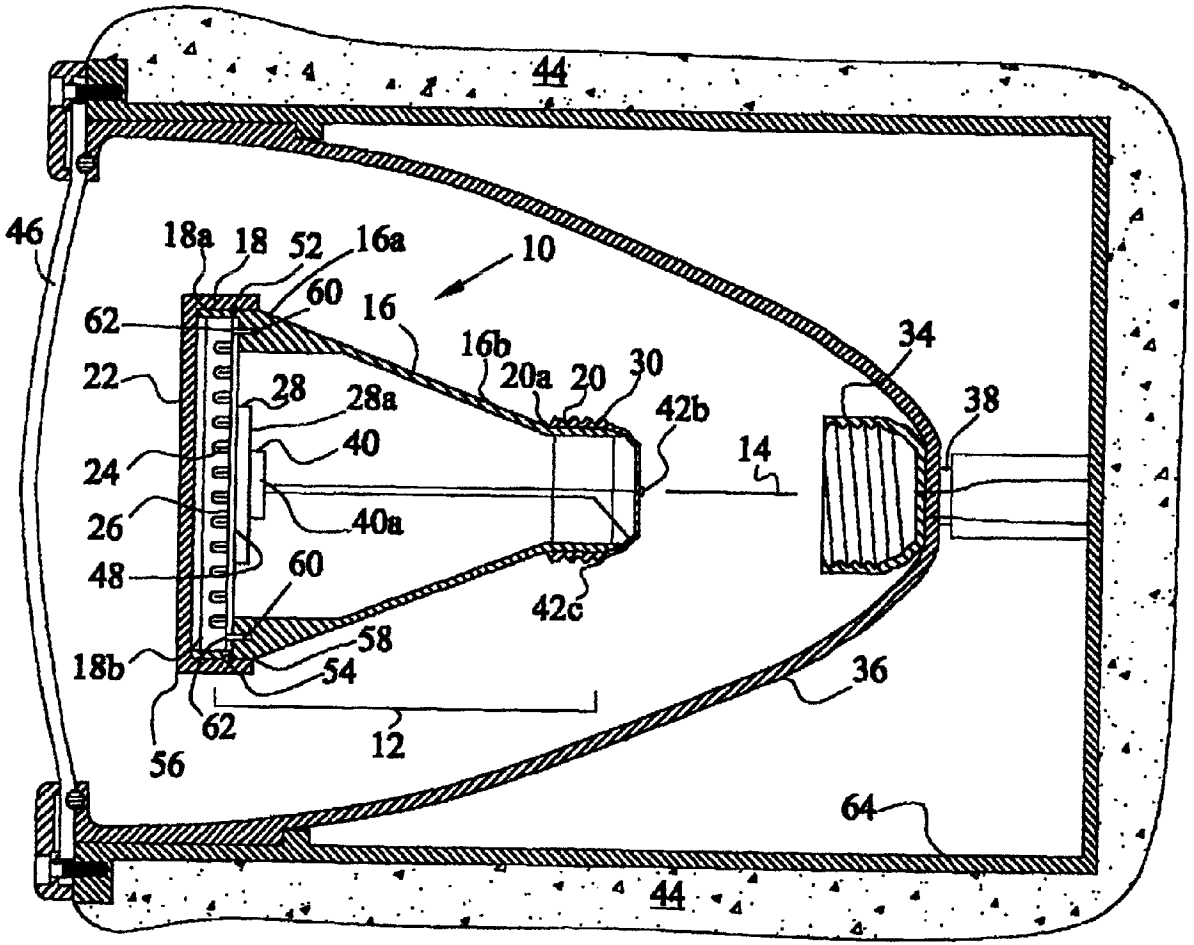
FIG. 1 is a cross-sectional view of the present invention in a pool lamp socket setting.

Referring now to the drawings, in particular FIG. 1, the invention which is a multicolor LED lamp bulb and is depicted generally as 10, includes a hollow lamp body 12 which extends along a central axis. The lamp body 12 includes a substantially tapered and symmetrically-shaped intermediate portion 16, a longitudinal portion 18 integral to a proximal end 16a of the intermediate portion 16 which extends a predetermined distance therefrom, and a stem portion 20 which is substantially cylindrical in shape and extends along the central axis 14. A proximal end 20a of the stem portion 20 is integral to a distal end 16b of the intermediate portion 16.

A lens 22 [is in a watertight and hermetically sealed engagement with an outside surface 18a of the longitudinal portion 18. The lens 22 encapsulates] *covers* a proximal end 18b of the longitudinal portion 18.

Figure 2:
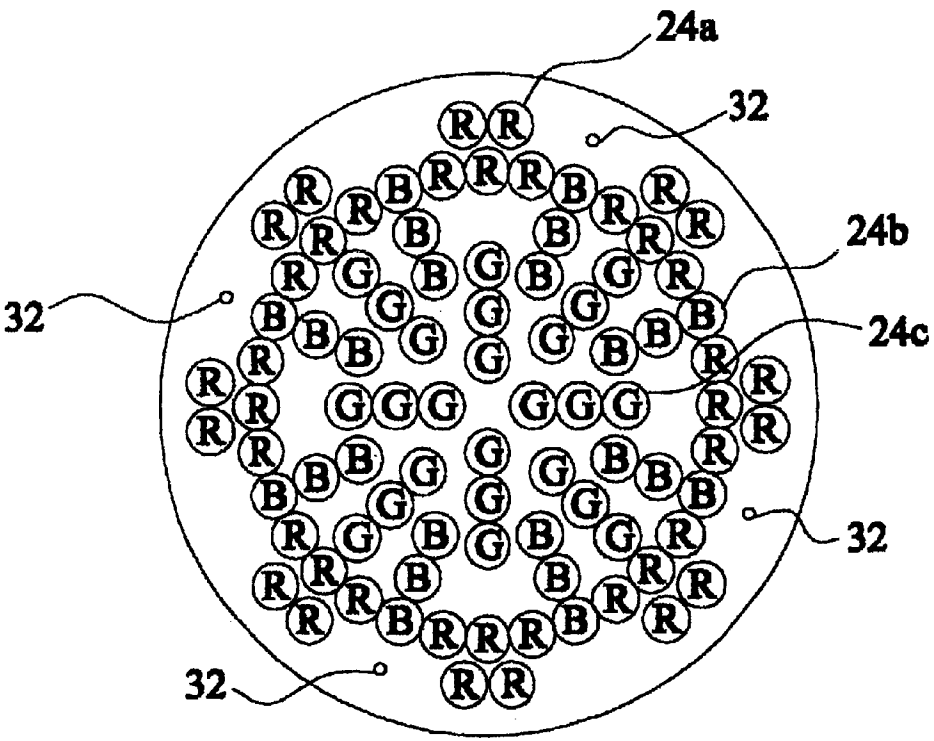
FIG. 2 depicts an arrangement of a practical application of the arrays of LED bulbs on a circuit board wafer.

A plurality of different colored light emitting diode (LED) bulbs 24 are mounted in a predetermined spaced-apart arrangement on a circuit board wafer 26 which is disposed proximate the intermediate portion 16 proximal end 16a. The circuit board wafer 26 is secured inside the lamp body 12 such that the circuit board wafer 26 is normal to the central axis 14 of the lamp body 12. In a practical application of a method to secure the circuit board wafer 26 to the lamp body 12, internal threaded projections 60 integral to the lamp body 12 are provided near the proximal end 16a of the intermediate portion 16 and mating holes 32 are provided in the circuit board wafer 26, as depicted in FIG. 2, through which screws 62 are inserted and fastened to the internal threaded projections 60. Of course, other attachment methods are contemplated, but not shown, such as by having a continuous projection or several projections emanating from the lens near the inside surface of the longitudinal portion 18 at such a length as to engage the circuit board wafer 26 such that its perimeter would be relatively tight against the surface of the proximal end 16a of the intermediate portion 16.

Figure 6A:
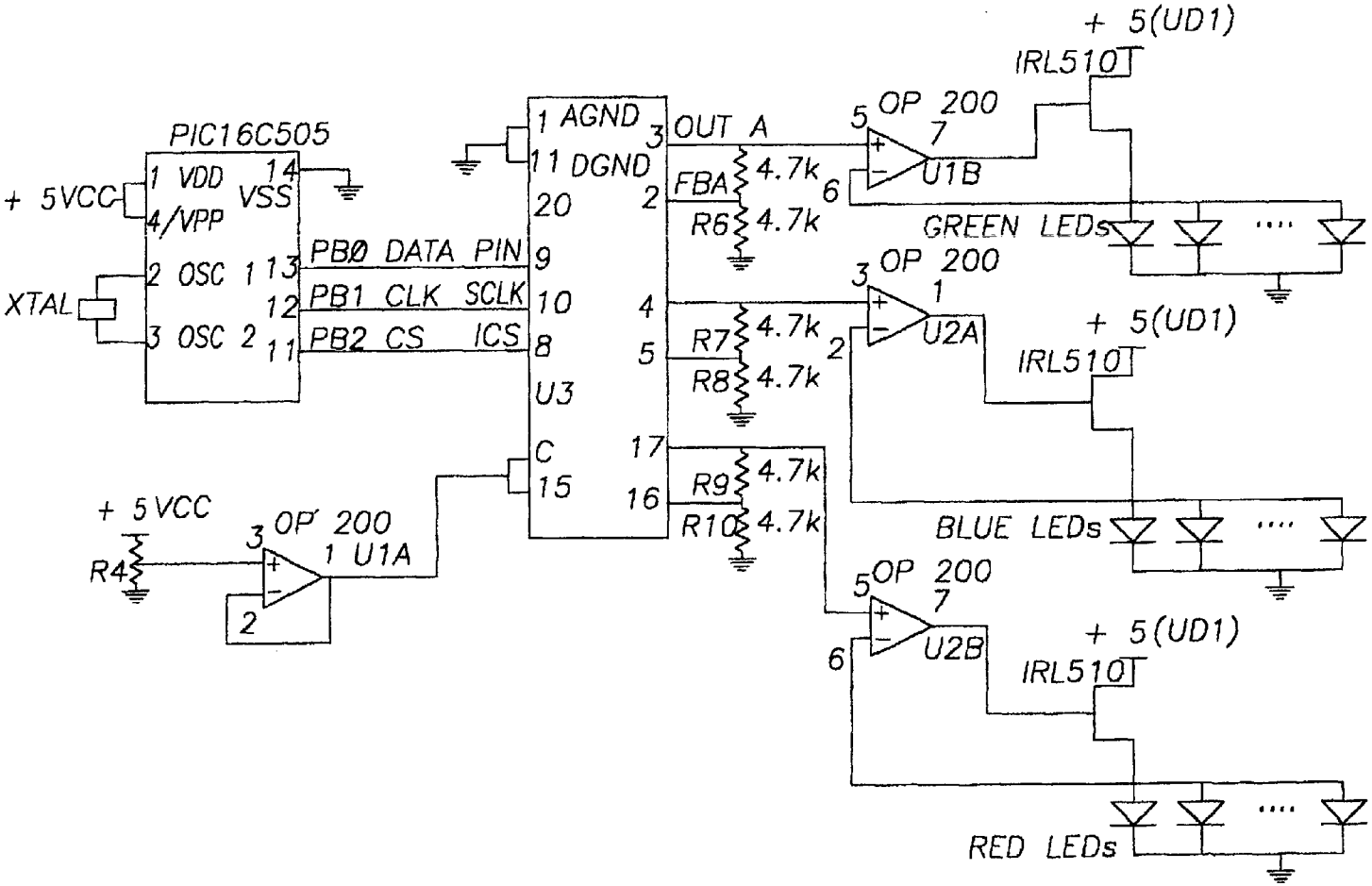
FIG. 6a is a schematic wiring diagram of a typical application of the controller circuit.
Figure 6B:
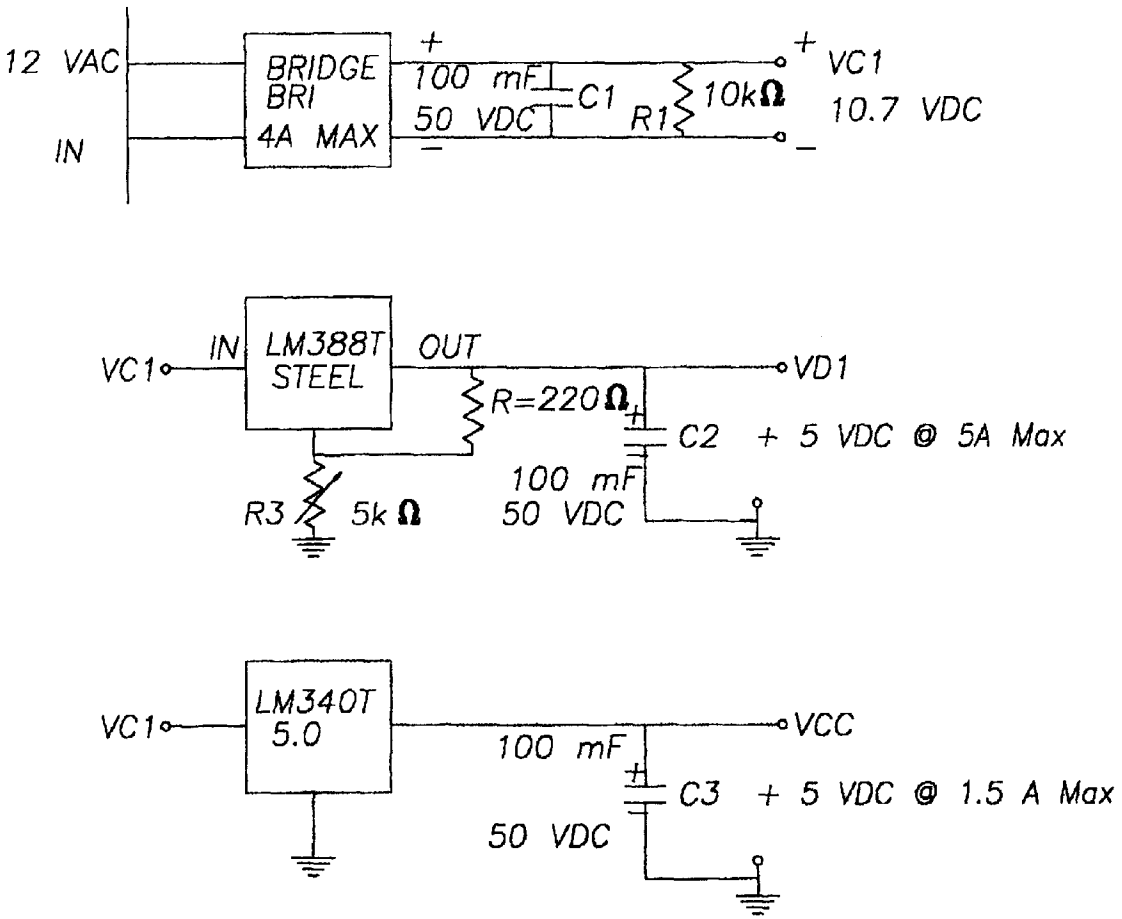
FIG. 6b is a schematic wiring diagram of a typical application of an a-c rectification circuit, an LED supply circuit and a logic supply circuit.

A controller circuit 28 in electrically operative communication with the predetermined arrays of the plurality of different colored LED bulbs 24 is included. The wiring, such as that schematically depicted in FIGS. 6a and 6b, is generally provided on a printed circuit board 28a and is electrically connected such that the predetermined arrays of the plurality of different colored LED bulbs 24 can activate at predetermined sequences for predetermined time intervals.

The controller circuit 28 is further electrically connected to a conventional screw-type base 30, which is affixed or otherwise secured to the stem portion 20. The screw-type base 30 is similar to that used for standard incandescent light bulbs and is therefore adapted to engage a conventional lamp socket 34. The screw-type base 30 typically has electrical connections 42a,42c separated by insulator 42b.

The controller circuit 28 includes a rectifier circuit 40 for converting a 12 volt-ac source 38 applied to the LED lamp bulb 10 through electrical connections 42a,42c in the screw-type base 30 to a 12 volt-dc circuit 48 for supplying electrical power to the arrays of the plurality of different colored LED bulbs 24. The rectifier circuit 40 may be incorporated into or be otherwise integral to the controller circuit 28 printed circuit board 28a or it may be part of a separate printed circuit board 40a that plugs into the printed circuit board 28a with the controller circuit 28.

Figure 5:
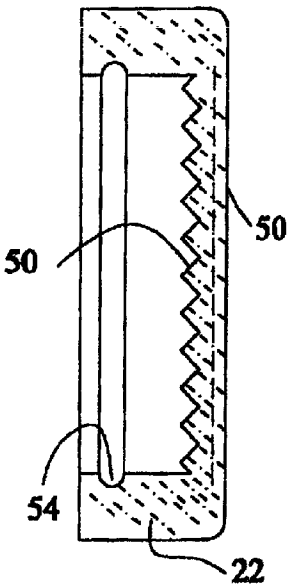
FIG. 5 is a cross-sectional view of the lens taken from view 5—5 of FIG. 4.
Figure 4:
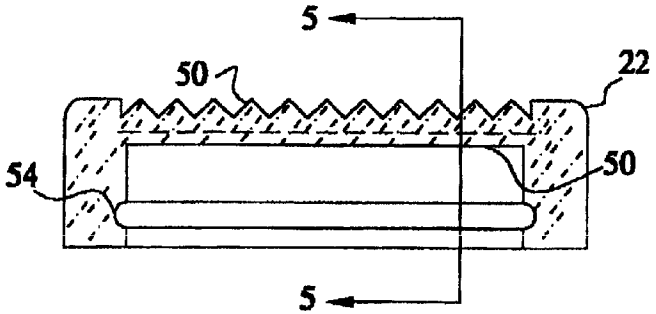
FIG. 4 is a cross-sectional view of the lens taken from view 4—4 of FIG. 3.
Figure 3:
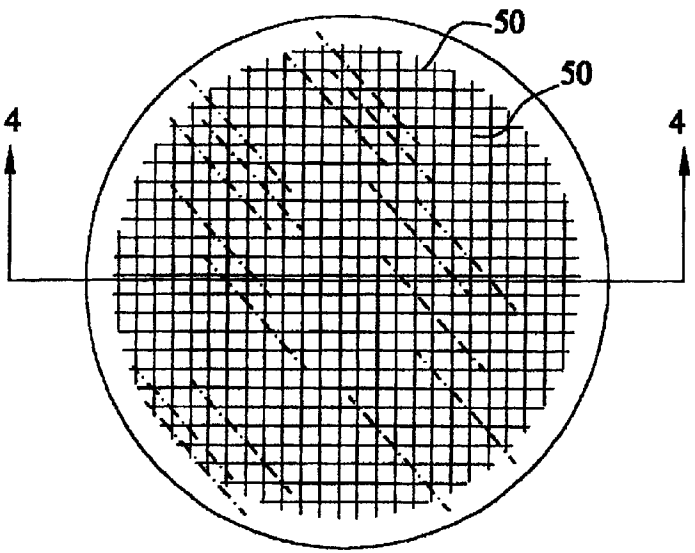
FIG. 3 is a frontal view of the lens.

Lens 22 includes a grid of grooves 50. FIGS. 3–5 depict one practical application of the grooves 50 within the lens 22, wherein grooves 50 are in opposite sides of the lens 22. The grooves 50 on one side are oriented approximately 90° from a direction of the opposite side grooves 50. The grooves 50 are typically V-shaped grooves and when provided as depicted in FIGS. 3–5, a rectangular or square shaped grid arrangement is formed when viewing the lens 22 axially. Alternatively, diamond shaped grids may be formed. The grooves 50 significantly enhance the dispersion of the light thereby providing more brilliance and aesthetic beauty to the lighting effects.

The controller circuit 28 may be integral to the circuit board wafer 26 with the mounted plurality of different colored LED bulbs 24. As previously described, for ease of assembly and replacement of defective parts found on an assembly line, it is preferable that the controller circuit 28 be integrated on a separate printed circuit board 28a.

Figure 6C:
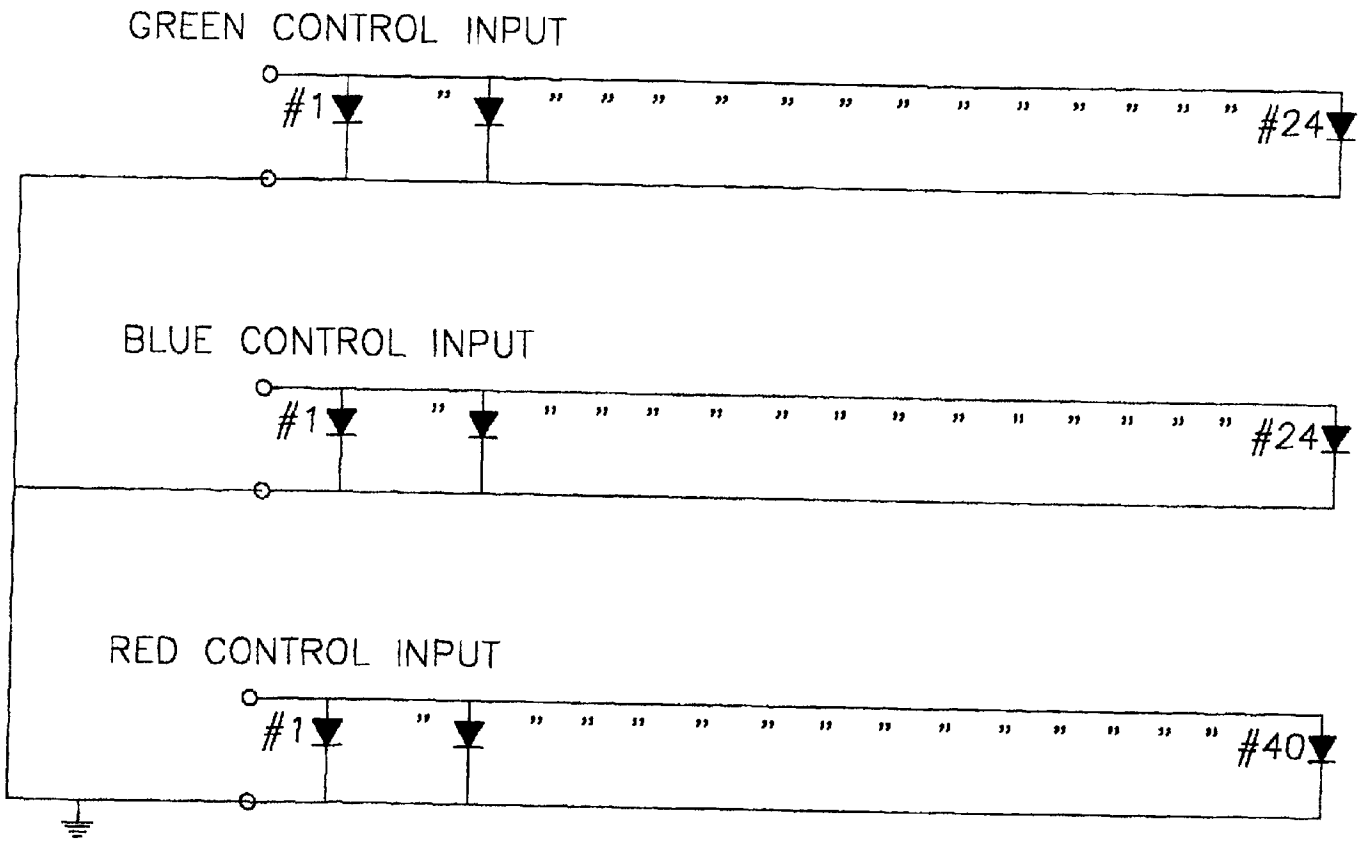
FIG. 6c is a schematic wiring diagram of a typical LED circuitry of the LED bulb arrays depicted in FIG. 2.

In a practical application of the novel LED lamp bulb 10, the plurality of different colored LED bulbs 24 include a combination of red, blue and green LED bulbs 24a,24b,24c respectively, at a respective ratio of 5:3:3. For example, FIG. 2 depicts a combination of eight clusters of five red LED bulbs 24a, eight clusters of three blue LED bulbs 24b, and eight clusters of three green LED bulbs 24, each cluster being arranged in a predetermined arrangement or set of arrays on the circuit board wafer 26. It was found that where the red LED bulbs 24a generally do not provide as brilliant or as intense a light effect as blue and green LED bulbs, 24b,24c respectively, which are about equal in intensity, then the addition of two red LED bulbs 24a for each cluster served to equalize and balance the lighting effect. Of course, different light color combinations and other ratios are also contemplated as within the realm of the invention; however, in some cases, the controller circuit 28 may have to be adapted to provide a desired equalized and balanced light intensity. FIG. 6c is a suggested wiring schematic of the light emitting diode (LED) circuitry for the arrays depicted in FIG. 2 and as described above.

In either case, the controller circuit 28 is preset to sequence the lighting of the arrays for specific time periods. For example, the arrays of red LED bulbs 24a may be sequenced to light for 60 seconds, then the arrays of blue LED bulbs 24b may light for 60 seconds, and then the arrays of green LED bulbs 24c may light for 60 seconds, after which the cycle is repeated.

The longitudinal portion 18 of the lamp body 12 optionally includes a ridge portion 52 which extends peripherally around the outside surface 18a of the longitudinal portion 18. The ridge portion 52 is cooperatively engages a mating recess portion 54 in an overlapping portion 56 of the lens 22. The lens 22 is [sealed to] *engaged with* the lamp body 12 at or near this point or area of contact. See 58 in FIG. 1.

The invention is adapted such that it can be used to replace bulbs currently used in underwater pool light sockets 34, where a 12 volt-ac power source 38 is supplied through the socket 34. As depicted in FIG. 1, a pool light in typically installed within a pool sidewall 44 inside a utility box 64. Socket 34 is at the base of the pool lamp encasement 36 which is protected with a pool lamp encasement lens 46.

The lens 22 is typically made from a clear plastic, polypropylene, or other similar polymeric material which is lightweight and suitable for use in pool lamp applications. Although lamp body 12 may be made from a variety of materials, including stainless steel or other non-corrosive materials, it is recommended that the lamp body 12 be made from an insulative polymeric material such as PVC or fiberglass reinforced resinous material for reduced manufacturing cost. The plurality of LED bulbs 24 are generally mounted into the circuit board wafer 26 with a resin.

As seen from the foregoing description, the present invention provides a novel apparatus to enhance pool lighting by providing a multicolor effect using a low cost and low energy LED lamp bulb.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A multicolor LED lamp bulb comprising:

a hollow lamp body extending along a central axis;

the lamp body including a substantially tapered and symmetrically-shaped intermediate portion, a longitudinal portion integral to a proximal end of the intermediate portion extending a predetermined distance therefrom, and a stem protein substantially cylindrical in shape extending along the central axis, a proximal end of the stem portion being integral to a distal end of the intermediate portion;

a lens [in a watertight and hermetically shaped engagement with an outside surface of the longitudinal portion, the lens encapsulating] *covering* a proximal end of the longitudinal portion;

a plurality of different colored light emitting diode (LED) bulbs mounted in a predetermined spaced-apart arrangement on a circuit board wafer disposed proximate the intermediate portion proximal end, the circuit board wafer being secured inside the lamp body wherein the circuit board wafer is normal to the central axis of the lamp body;

a controller circuit in electrically operative communication with predetermined arrays of the plurality of different colored LED bulbs wherein the predetermined arrays of the plurality of different colored LED bulbs activate at predetermined sequences for predetermined time intervals; and the controller circuit further being electrically connected to a conventional screw-type base, the screw-type base being affixed to the stem portion and adapted to engage a conventional lamp socket.

2. The multicolor LED lamp bulb according to claim 1, wherein the controller circuit includes a rectifier circuit for converting a 12 volt-ac source applied to the LED lamp bulb through electrical connections in the screw-type base to a 12 volt-dc circuit for supplying electrical power to the arrays of the plurality of different colored LED bulbs.

3. The multicolor LED lamp bulb according to claim 1, wherein the lens includes a grid of grooves in opposite sides of the lens, the grooves on one side being oriented approximately 90° from a direction of the opposite side grooves.

4. The multicolor LED lamp bulb according to claim 1, wherein the controller circuit is integral to the circuit board wafer with the mounted plurality of different colored LED bulbs.

5. The multicolor LED lamp bulb according to claim 2, wherein the controller circuit, including the rectifier circuit is integral to the circuit board wafer with the mounted plurality of different colored LED bulbs.

6. The multicolor LED lamp bulb according to claim 1, wherein the controller circuit is incorporated into a printed circuit board separate from the circuit board wafer with the mounted plurality of different colored LED bulbs, the controller circuit printed circuit board being electrically connected to the circuit board wafer with the mounted plurality of different colored LED bulbs when joined together.

7. The multicolor LED lamp bulb according to claim 6, wherein the controller circuit includes a rectifier circuit for converting a 12 volt-ac source applied to the LED lamp bulb through electrical connections in the screw-type base to a 12 volt-dc circuit for supplying electrical power to the arrays of the plurality of different colored LED bulbs.

8. The multicolor LED lamp bulb according to claim 1, wherein the plurality of different colored LED bulbs include a combination of red, blue and green LED bulbs at a respective ratio of 5:3:3.

9. The multicolor LED lamp bulb according to claim 8, wherein the plurality of different colored LED bulbs include eight clusters of five red LED bulbs, eight cluster of three blue LED bulbs, and eight clusters of three green LED bulbs, each cluster being in a predetermined spaced-apart arrangement on the circuit board wafer.

10. The multicolor LED lamp bulb according to claim 5, wherein the plurality of different colored LED bulbs include a combination of red, blue and green LED bulbs at a respective ratio of 5:3:3.

11. The multicolor LED lamp bulb according to claim 10, wherein the plurality of different colored LED bulbs include eight clusters of five red LED bulbs, eight cluster of three blue LED bulbs, and eight clusters of three green LED bulbs, each cluster being in a predetermined spaced-apart arrangement on the circuit board wafer.

12. The multicolor LED lamp bulb according to claim 7, wherein the plurality of different colored LED bulbs include a combination of red, blue and green LED bulbs at a respective ratio of 5:3:3.

13. The multicolor LED lamp bulb according to claim 12, wherein the plurality of different colored LED bulbs include eight clusters of five red LED bulbs, eight cluster of three blue LED bulbs, and eight clusters of three green LED bulbs, each cluster being in a predetermined spaced-apart arrangement on the circuit board wafer.

14. The multicolor LED lamp bulb according to claim 1, wherein the longitudinal portion of the lamp body includes a ridge portion extending peripherally around the outside surface of the longitudinal portion, the ridge portion for cooperative engagement with a mating recess portion in an overlapping portion of the lens.

* * * * *